US012703169B2

(12) United States Patent
Read et al.

(10) Patent No.: US 12,703,169 B2
(45) Date of Patent: Aug. 11, 2026

(54) CERAMIC MATRIX COMPOSITES AND THEIR PREFORMS

(71) Applicant: RTX Corporation, Farmington, CT (US)

(72) Inventors: Kathryn Sarah Read, Marlborough, CT (US); Brendan Michael Lenz, North Branford, CT (US); James T. Roach, Vernon, CT (US); Steven R. Clarke, Mansfield, MA (US); Aaron Tomich, Sutton, MA (US)

(73) Assignee: RTX CORPORATION, Farmington, CT (US)

( * ) Notice: Subject to any disclaimer, the term of this patent is extended or adjusted under 35 U.S.C. 154(b) by 230 days.

(21) Appl. No.: 18/571,444

(22) PCT Filed: Jun. 17, 2022

(86) PCT No.: PCT/US2022/033998

§ 371 (c)(1),
(2) Date: Dec. 18, 2023

(87) PCT Pub. No.: WO2022/266445

PCT Pub. Date: Dec. 22, 2022

(65) Prior Publication Data

US 2024/0278529 A1 Aug. 22, 2024

Related U.S. Application Data

(60) Provisional application No. 63/291,875, filed on Dec. 20, 2021, provisional application No. 63/212,356, filed on Jun. 18, 2021.

(51) Int. Cl.
*B32B 5/26* (2006.01)
*B32B 5/06* (2006.01)

(52) U.S. Cl.
CPC ................ *B32B 5/263* (2021.05); *B32B 5/06* (2013.01); *B32B 2260/021* (2013.01); *B32B 2260/04* (2013.01); *B32B 2305/026* (2013.01)

(58) Field of Classification Search
None
See application file for complete search history.

(56) References Cited

U.S. PATENT DOCUMENTS 5,354,398 A 10/1994 Kawai
5,487,941 A 1/1996 Pepin
(Continued)

FOREIGN PATENT DOCUMENTS

CA 1175332 A 10/1984
WO 2018139028 A1 8/2018
(Continued)

OTHER PUBLICATIONS

Search Report issued in European Patent Application No. 22912342.7; Date of Mailing Nov. 14, 2025 (9 pages).
(Continued)

*Primary Examiner* — Chinessa T. Golden
(74) *Attorney, Agent, or Firm* — CANTOR COLBURN LLP

(57) ABSTRACT

A preform comprising a first sub-laminate comprising a plurality of layers and a second sub-laminate comprising a plurality of layers. The first sub-laminate comprises a first unit cell comprising a first volume fraction of tows, where the first volume fraction of tows comprise first tows having a first tow spacing between successive first tows. The second sub-laminate comprises a second unit cell comprising a second volume fraction of tows, where the second volume fraction of tows comprise second tows having a second tow spacing between successive second tows. The first volume fraction of tows in the first unit cell is equal to the second
(Continued)

volume fraction of tows in the second unit cell. The second tow spacing is less than the first tow spacing.

20 Claims, 10 Drawing Sheets

(56) References Cited

U.S. PATENT DOCUMENTS 5,916,510 A 6/1999 Jessen
5,939,216 A 8/1999 Kameda et al.
5,961,661 A 10/1999 Jessen
6,418,973 B1 7/2002 Cox et al.
6,641,893 B1 11/2003 Suresh et al.
7,073,538 B2 7/2006 Bhatnagar et al.
7,223,465 B2 5/2007 Subramanian et al.
7,754,126 B2 7/2010 Subramanian et al.
8,545,938 B2 10/2013 Schmidt et al.
9,550,340 B2 1/2017 Olivier
9,908,305 B2 3/2018 Chamberlain et al.
10,011,535 B2 7/2018 La Forest et al.
10,279,553 B2 5/2019 Hyson
10,384,981 B2 8/2019 Hall et al.
10,480,108 B2 11/2019 Shi
10,604,872 B1 3/2020 Stackpoole et al.
10,618,848 B2 4/2020 Luthra et al.
10,822,280 B2 11/2020 Harris et al.
10,913,687 B2 2/2021 Dambrine
10,995,039 B1 5/2021 Dunn et al.
10,995,040 B2 5/2021 Lamusga et al.
11,021,779 B2 6/2021 Barrett et al.
11,097,983 B2 8/2021 Hall et al.
2003/0232946 A1 12/2003 Pope et al.
2007/0007678 A1 1/2007 Benitsch
2010/0119777 A1 5/2010 Merrill et al.
2015/0240072 A1 8/2015 Esser-Kahn et al.
2016/0136925 A1* 5/2016 Chamberlain .... C04B 35/62844 428/113
2016/0348511 A1 12/2016 Varney
2017/0015595 A1* 1/2017 Weaver ................ C04B 35/591
2017/0306769 A1 10/2017 Lazur
2018/0002238 A1* 1/2018 Hockemeyer ..... C04B 35/62884
2018/0044249 A1 2/2018 Taillet et al.
2018/0179906 A1 6/2018 Schetzel et al.
2018/0312950 A1 11/2018 Barrett et al.
2019/0048730 A1 2/2019 Subramanian et al.
2019/0100845 A1 4/2019 Ohashi et al.
2019/0177240 A1 6/2019 Harris
2019/0345073 A1 11/2019 Hall et al.
2019/0359531 A1 11/2019 Steffier et al.
2020/0011190 A1 1/2020 Read
2020/0181029 A1 6/2020 Clerambourg et al.
2020/0308066 A1 10/2020 Shiang et al.
2020/0346983 A1 11/2020 Read et al.
2021/0024427 A1 1/2021 Liliedahl et al.
2021/0262353 A1 8/2021 Mccaffrey et al.
2023/0019485 A1 1/2023 Sudre et al.
2023/0191656 A1 6/2023 Read et al.
2023/0192562 A1 6/2023 Read et al.
2024/0067578 A1 2/2024 Konopaske et al.
2024/0199499 A1 6/2024 Read et al.
2024/0278543 A1 8/2024 Roach et al.

FOREIGN PATENT DOCUMENTS

WO 2020209848 A1 10/2020
WO 2022266446 A1 12/2022

OTHER PUBLICATIONS

Search Report issued in European Patent Application No. 22912343.5; Date of Mailing Nov. 24, 2025 (8 pages).
Search Report issued in European Patent Application No. 22912344.3; Date of Mailing Dec. 1, 2025 (8 pages).
International Search Report and Written Opinion issued in International Application No. PCT/US2022/053351; International Filing Date Dec. 19, 2022; Date of Mailing Mar. 17, 2023 (9 pages).
International Search Report and Written Opinion issued in International Application No. PCT/US2022/053354; International Filing Date Dec. 19, 2022; Date of Mailing Mar. 29, 2023 (12 pages).
International Search Report and Written Opinion issued in International Application No. PCT/US2022/053356; International Filing Date Dec. 19, 2022; Date of Mailing Mar. 22, 2023 (10 pages).
International Search Report for International Application Serial No. PCT/US2022/033998; International Filing Date Jun. 17, 2022; Report Mail Date Dec. 5, 2022 (7 pages).
International Search Report for International Application Serial No. PCT/US2022/034000; International Filing Date Jun. 17, 2022; Report Mail Date Oct. 11, 2022 (5 pages).
Written Opinion for International Application Serial No. PCT/US2022/033998; International Filing Date Jun. 17, 2022; Report Mail Date Dec. 5, 2022 (12 pages).
Written Opinion for International Application Serial No. PCT/US2022/034000; International Filing Date Jun. 17, 2022; Report Mail Date Oct. 11, 2022 (10 pages).

* cited by examiner

CERAMIC MATRIX COMPOSITES AND THEIR PREFORMS

CROSS REFERENCE TO RELATED APPLICATIONS

This application is a National Stage Application of PCT/US2022/033998, filed Jun. 17, 2022, which claims the benefit of U.S. Provisional Application No. 63/212,356, filed Jun. 18, 2021 and U.S. Provisional Application No. 63/291,875, filed Dec. 20, 2021, all of which are incorporated by reference in their entirety herein.

BACKGROUND

This disclosure relates to a composite architecture, methods of manufacture thereof and articles comprising the same. In particular, this disclosure relates to composite architecture for ceramic matrix composites, methods of manufacture thereof and articles comprising the same.

Preforms are used for the fabrication of ceramic matrix composite (CMC) structures using chemical vapor infiltration (CVI), polymer infiltration pyrolysis (PIP), melt infiltration (MI), and the like. A preform can include fibers, which can be unidirectional or woven (e.g., plain weave, 5 Harness Satin Weave, 8 Harness Satin Weave, twill, 3-dimensional, 3D biaxial and triaxial braiding). In one form the fibers can be ceramic based and can be formed of silicon carbide (SIC). Within the CVI reaction chamber at an elevated temperature the preform can be exposed to certain precursors. On being exposed to the certain precursors at an elevated temperature, a reaction can occur resulting in the deposition of a ceramic on the fibers of the preform.

Ceramic matrix composites (CMCs) made using chemical vapor infiltration (CVI) can potentially be used at temperatures of up to and greater than 2700° F. One of the key limitations of a CVI CMC structure is that the structure can contain significant porosity (e.g., up to 15% and more) which is typically greatest in the center of the CMC structure and which can increase with an increasing thickness of the preform. The porosity can increase with thickness and can significantly impact both the in-plane and inter-laminar properties and overall oxidation resistance of the composite.

FIG. 1 depicts a conventional two dimensional (2D) ceramic matrix composite 100 that contains a plurality of woven layers (first woven layer 102/103; second woven layer 202/203; third woven layer 104/105; fourth woven layer 204/205; and so on). While the FIG. 1 is directed to a 2D ceramic matrix composite and associated problems that occur during precursor infiltration, this disclosure is directed to solving problems that occur in both 2D and 3D ceramic matrix composites. The 2D composite in the FIG. 1 is used to illustrate the problems (with precursor infiltration) for ease of illustration.

Each woven layer comprises a weaving pattern in which the warp and fill fibers alternate. The warp fiber is the set of tows stretched in place on a loom before the fill tows are introduced during the weaving process. For example, in the first woven layer 102/103 the fiber 102 is the warp fiber and extends in length along the longitudinal direction (shown by the arrow) alternating above and below successive fill fibers 103 that extend in the lateral direction. The weaves shown in the FIG. 1 are created using groups of filaments called tows or fibers. In this disclosure the term "fiber" is used interchangeably with the term "tow". The lateral direction is into the plane of the paper and is perpendicular to the longitudinal direction (which is in the plane of the paper).

In the first woven layer 102/103, it may be seen that the successive fill fibers 103 are periodically spaced and are equidistant from one another. The warp fiber 102 therefore has the profile of a sine wave. While the FIG. 1 depicts the warp fibers as being sinusoidal, this is for purposes of demonstration only. Other forms of periodicity (that are not necessarily sinusoidal) may be used in the respective layers.

The second woven layer 202/203 contains a warp fiber 202 that extends in the longitudinal direction and alternates above and below successive fill fibers 203 that extend in the lateral direction. The fill fibers 203 in the second woven layer 202/203 are displaced by half a wavelength from the fill fibers 103 in the first layer 102/103. The successive fill fibers 203 in the second layer are also periodically spaced and are equidistant from one another. The periodicity (81) of the fill fibers 103 in the first woven layer 102/103 is equal to the periodicity (82) of the fill fibers 203 in the second woven layer 202/203.

It may be seen that the fibers in each alternating layer from the top of the composite are in phase with each other (i.e., the fill fibers lie directly atop one another). For example, in the uncompressed state, the fill fiber 103 of the first woven layer 102/103 lies directly above the fill fiber 105 of the third woven layer 104/105. Similarly, the fill fiber 203 of the second woven layer 202/203 lies directly above the fill fiber 205 of the fourth woven fly 204/205. This pattern continues from the outer surface 292 to the center of the ceramic matrix composite 100. The center is identified by the line AA'. The same pattern is established from the inner surface 294 to the center AA' of the ceramic matrix composite 100.

From the FIG. 1, it may be seen that the periodicity (82) of the fill fibers 203 in the second woven layer 102/103 is equal to the periodicity (83) of the fill fibers 105 in the third woven layer 104/105, which is turn equal to the periodicity (84) of the fill fibers 205 in the fourth woven layer 204/205. It may be observed that the periodicity of the fill fibers in the first, second, third and fourth woven layers are equal to one another. In other words, $\delta_1=\delta_2=\delta_3=\delta_4$. This uniform periodicity between the fill fibers in the various layers is also established in the lower section of the ceramic matrix composite that extends from the inner surface 294 to the center line AA'.

The arrangement shown in the FIG. 1 is disadvantageous in that the constant periodicity between of the fill fiber in alternating layers prevents the CVI precursors from easily diffusing into the center of the composite matrix. During the CVI process, the precursors react preferentially on the outer layers (those closer to the surface 292 and the surface 294) due to a less tortuous diffusion path and fill in the spaces between the fibers in these layers. This higher rate of reaction on the outermost layers prevents ingress of subsequent precursors into the center of the ceramic matrix composite. The inability to infiltrate the central portion of the preform produces voids in the center of the matrix. This density variation is reflected in the shading in FIG. 1. The shading gradually lightens in color from the outer surface to the center of the composite indicating that the center contains a larger relative volume fraction of porosity and consequently a lower material density. It also produces density differences between the outer regions of the composite (i.e., the surfaces 292 and 294) and the central region of the composite.

As noted above, while the FIG. 1 is directed to a 2D ceramic matrix composite, the issues that occur in the 2D ceramic matrix also manifest themselves in 3D ceramic matrix composites.

It is therefore desirable to design 2D and 3D composites and methods for manufacturing such composites, where the aforementioned matrix density differences do not occur and where voids are reduced thus providing the composite with a longer life span.

SUMMARY

Disclosed herein is a preform comprising a first sub-laminate comprising a plurality of layers and a second sub-laminate comprising a plurality of layers. The first sub-laminate comprises a first unit cell comprising a first volume fraction of tows, where the first volume fraction of tows comprise first tows having a first tow spacing between successive first tows. The second sub-laminate comprises a second unit cell comprising a second volume fraction of tows, where the second volume fraction of tows comprise second tows having a second tow spacing between successive second tows. The first volume fraction of tows in the first unit cell is equal to the second volume fraction of tows in the second unit cell. The second tow spacing is less than the first tow spacing.

In an embodiment, the first tow spacing produces a first average pore size and where the second tow spacing produces a second average pore size; where the first average pore size is greater than the second average pore size.

In another embodiment, a number of second tows in the second unit cell is greater than a number of first tows in the first unit cell.

In yet another embodiment, a second tow diameter in the second unit cell is smaller than a first tow diameter in the first unit cell.

In yet another embodiment, the first sub-laminate contacts the second sub-laminate; and wherein a warp tow or a z-fiber from the first sub-laminate penetrates the second sub-laminate or vice versa.

In yet another embodiment, the first tow spacing and the second tow spacing are both periodic.

In yet another embodiment, the first tow spacing is periodic while the second tow spacing is aperiodic or vice versa.

In yet another embodiment, the preform comprises a plurality of sub-laminates in addition to the first sub-laminate and the second sub-laminate; and where each sub-laminate of the plurality of sub-laminates has a same tow volume fraction per unit cell as that of the first sub-laminate.

In yet another embodiment, the first sub-laminate contains an outermost layer, while the second sub-laminate does not contain an outermost layer.

In an embodiment, a ceramic matrix composite comprises a 3D preform into which a ceramic precursor is infiltrated, where a 3D preform comprises a first sub-laminate comprising a plurality of layers and a second sub-laminate comprising a plurality of layers. The first sub-laminate comprises a first unit cell comprising a first volume fraction of tows, where the first volume fraction of tows comprise first tows having a first tow spacing between successive first tows. The second sub-laminate comprises a second unit cell comprising a second volume fraction of tows, where the second volume fraction of tows comprise second tows having a second tow spacing between successive second tows. The first volume fraction of tows in the first unit cell is equal to the second volume fraction of tows in the second unit cell. The second tow spacing is less than the first tow spacing.

Disclosed herein is a preform that comprises a first sub-laminate a second sub-laminate. The first sub-laminate comprises a first plurality of first layers; where at least one layer of the first plurality of first layers comprises a first spacing between successive first tows that is different from a second spacing between successive second tows in an adjacent first layer. The first sub-laminate has a first average pore size. The second sub-laminate comprises a second plurality of second layers. Each layer of the second plurality of second layers has a third spacing between successive tows. The second sub-laminate has a second average pore size that is less than the first average pore size. At least one of the first sub-laminate or the second sub-laminate has at least two gradients in porosity that have opposing slopes. The first average pore size is determined by the first spacing and the second spacing.

In an embodiment, the first sub-laminate contacts the second sub-laminate. A warp tow or a z-fiber from the first sub-laminate penetrates the second sub-laminate or vice versa.

In an embodiment, the first sub-laminate comprises an outermost layer and wherein the second sub-laminate does not comprise an outermost layer.

In an embodiment, the first spacing is periodic and the second spacing is periodic.

In an embodiment, a ceramic matrix composite comprises a preform into which a ceramic precursor is infiltrated, where the preform comprises a first sub-laminate a second sub-laminate. The first sub-laminate comprises a first plurality of first layers; where at least one layer of the first plurality of first layers comprises a first spacing between successive first tows that is different from a second spacing between successive second tows in an adjacent first layer. The first sub-laminate has a first average pore size. The second sub-laminate comprises a second plurality of second layers. Each layer of the second plurality of second layers has a third spacing between successive tows. The second sub-laminate has a second average pore size that is less than the first average pore size. At least one of the first sub-laminate or the second sub-laminate has at least two gradients in porosity that have opposing slopes. The first average pore size is determined by the first spacing and the second spacing.

In an embodiment, a preform comprises a first region and a second region. The first region comprises one or more first sub-laminates, wherein the one or more first sub-laminates comprise a first gradient in average pore size along a first cross-section of the preform, where the first cross-section of the preform is located in the first region. The second region contacts the first region. The second region comprises one of more second sub-laminates. The one or more second sub-laminates comprise a second gradient in average pore size along a second cross-section of the preform. The second gradient in average pore size is different from the first gradient in average pore size. The first region has a different thickness from the second region. The second cross-section is located at the second region and the second region is not the same as the first region.

In another embodiment, the preform further comprises a third region that comprises one or more third sub-laminates. The one or more third sub-laminates comprise a third gradient in average pore size along a third cross-section of the preform. The third gradient in average pore size is different from at least one of the first gradient or the second gradient. The third cross-section is located at the third region.

In an embodiment, the thickness of the third region is the same as that of the first region and different from a thickness of the second region.

In an embodiment, a ceramic matrix composite comprises a preform into which a ceramic precursor is infiltrated, where the preform comprises a first region and a second region. The first region comprises one or more first sub-laminates; wherein the one or more first sub-laminates comprise a first gradient in average pore size along a first cross-section of the preform, where the first cross-section of the preform is located in the first region. The second region contacts the first region. The second region comprises one of more second sub-laminates. The one or more second sub-laminates comprise a second gradient in average pore size along a second cross-section of the preform. The second gradient in average pore size is different from the first gradient in average pore size. The first region has a different thickness from the second region. The second cross-section is located at the second region and the second region is not the same as the first region.

DETAILED DESCRIPTION

Definitions

Pores

A pore is defined as the space between the tows. A tow comprises a plurality of filaments. The spaces between the filaments within the tow is not a pore. The distribution of pore sizes can be tailored to facilitate more complete precursor infiltration to form a ceramic matrix composite with a uniform matrix density through the composite. Pores are also sometimes referred to as voids and these terms are used interchangeably in this disclosure. The term "pore size" as used herein refers to the average pore size. The term "pore size" and "average pore size" are used interchangeably.

Matrix Density

The matrix density may also be referred to as the bulk density. The matrix density is the density of the material considered to be part of the matrix. The matrix includes the material of the matrix (such as for example, SiC) and pores present in this matrix material. Pores are spaces between the tows where there is no matrix material (but where the presence of the matrix material is desired). The matrix volume fraction therefore is the fraction of the matrix material divided by the total volume of the ceramic matrix composite that could be occupied by the matrix material. It is generally desirable for the matrix volume fraction to be as high as possible and for the pore volume fraction to be minimized as much as possible. The maximum matrix material volume fraction would be that obtained by subtracting the volume of the tows from the total volume of the ceramic matrix composite.

Layers, Sub-Laminates, Preforms and Ceramic Matrix Composites

A woven layer comprises a weaving pattern in a single plane (linear or curvilinear) in which the warp and/or fill fibers alternate. A braided layer comprises a braided pattern in which bias fibers alternate. The braided layer may include biaxial or triaxial fibers as detailed below. For purposes of this disclosure, a plurality of layers are termed a sub-laminate. The sub-laminate may have a gradient in pore sizes or in fiber concentration per unit volume prior to precursor (or matrix) infiltration. A plurality of sub-laminates may be arranged adjacent to one another to form a preform. The plurality of sub-laminates may have a plurality of gradients in pore sizes or in fiber concentration per unit volume. Each sub-laminate may have a gradient in pore sizes (or in fiber concentration per unit volume) that is different from a gradient in a neighboring sub-laminate. A gradient is the increase or decrease in the magnitude of void sizes (or of fiber concentration) observed in passing from one point to another. The increase or decrease in the magnitude of void sizes (or of fiber concentration) observed in passing from one point to another divided by the thickness of the layer or sub-laminate is defined as the rate of gradient change. When the preform is infiltrated with a ceramic it forms a ceramic matrix composite.

Figure 1A:
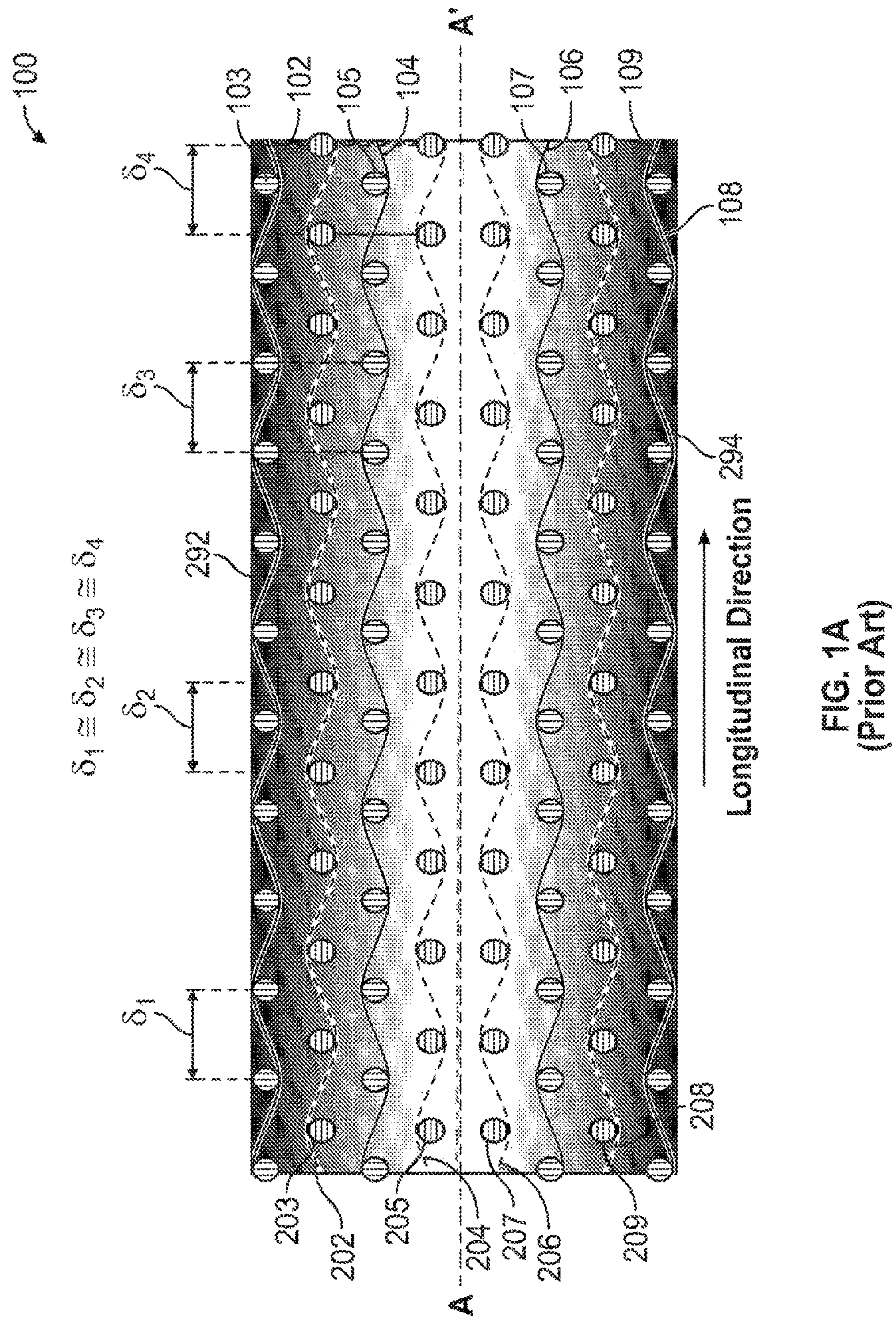
FIG. 1A depicts a conventional two dimensional (2D) ceramic matrix composite that contains a plurality of woven layers.
Figure 1B:
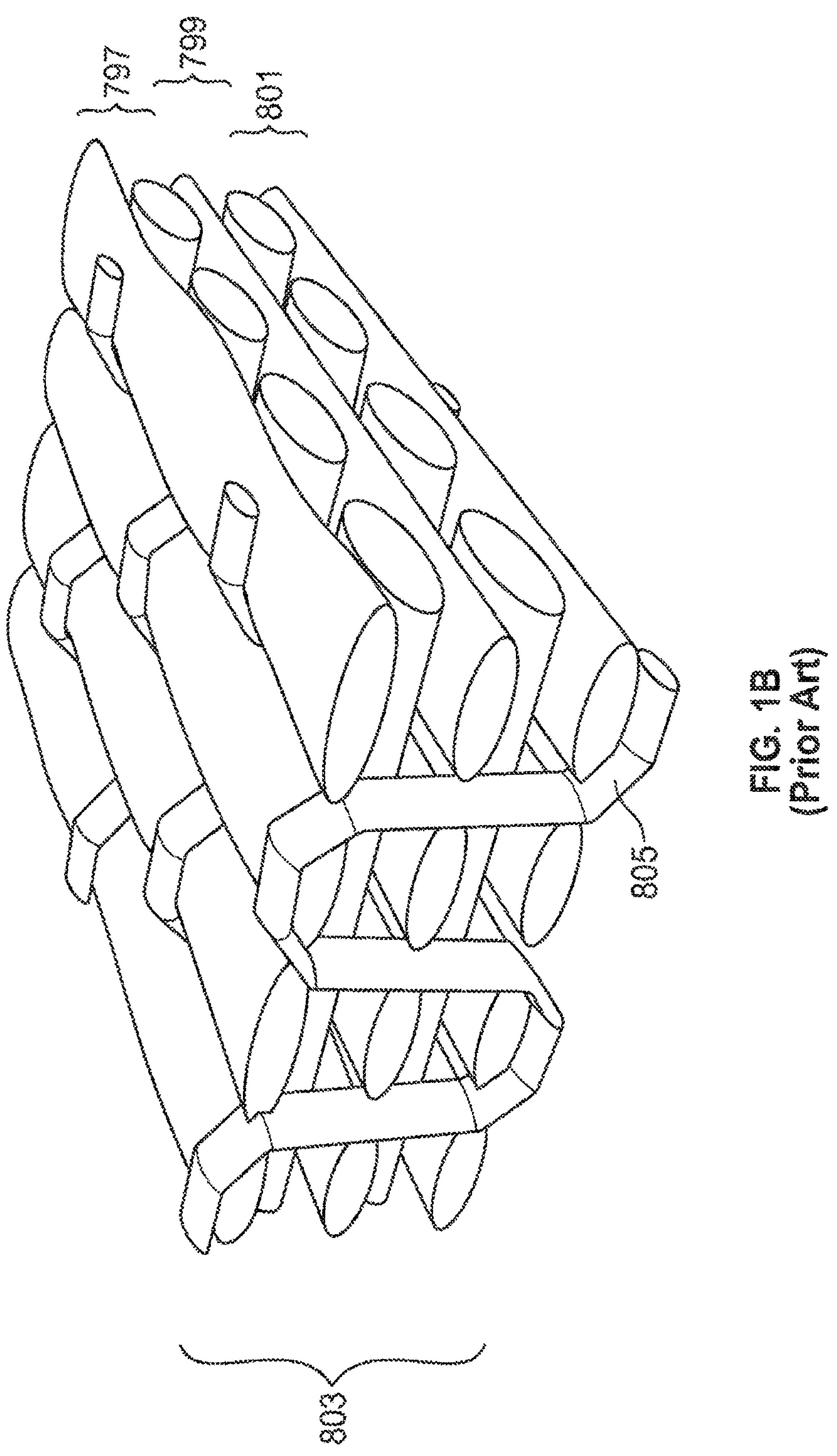
FIG. 1B depicts layers in a sub-laminate in a 3D orthogonal weave.
Figure 1C:
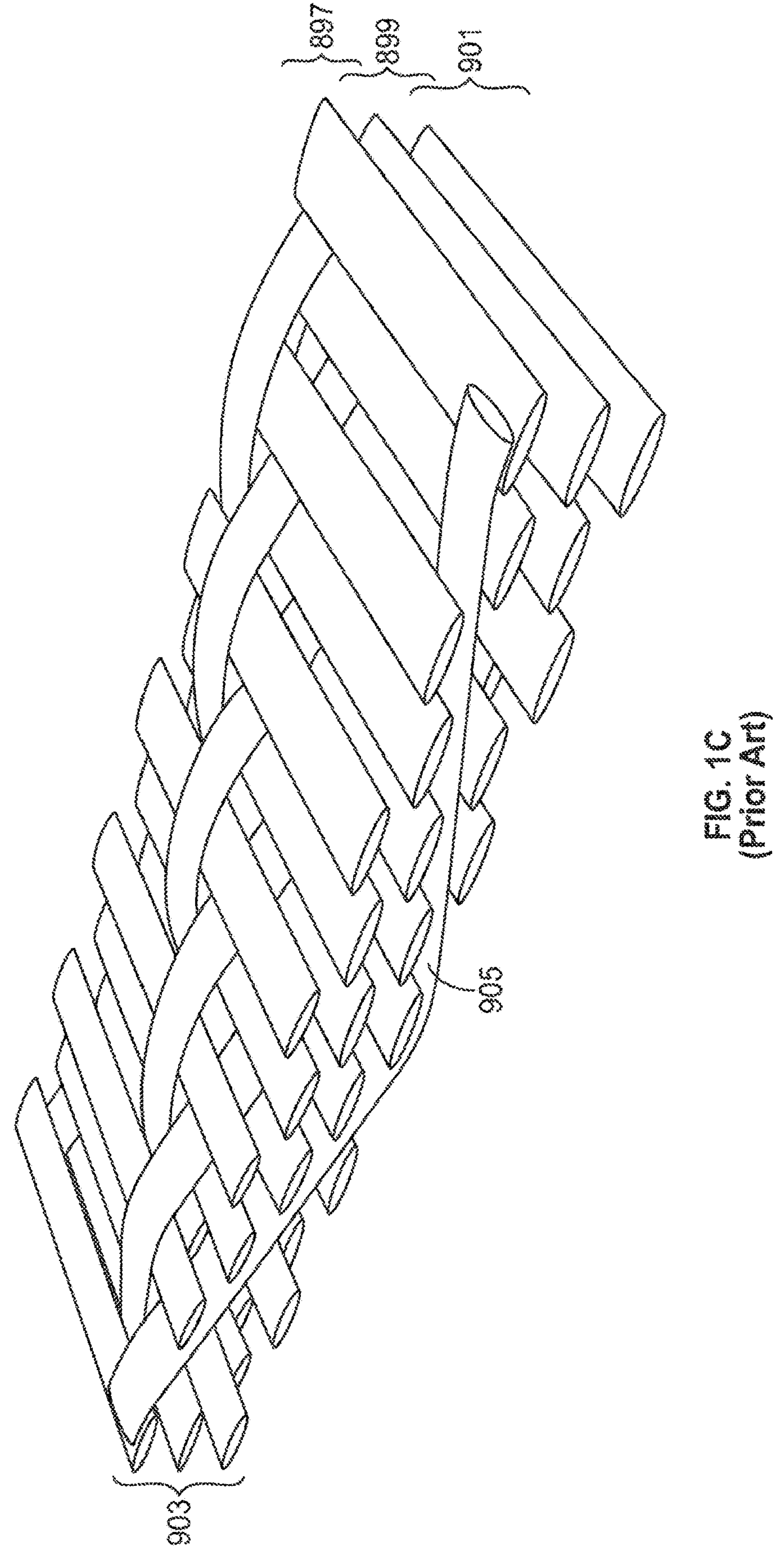
FIG. 1C depicts layers in a sub-laminate in a 3D angle interlock weave.

FIGS. 1B and 1C provide examples of layers and sub-laminates. FIG. 1B depicts a 3D orthogonal woven sub-laminate 803 that comprises three layers 797, 799 and 801 disposed atop each other. The two layers 797 and 799 each have a plurality of weft tows interwoven with fill tows. The sub-laminate is formed by interweaving a z-fiber 805 through the three layers 797, 799 and 801.

FIG. 1C depicts a 3D angle-interlock sub-laminate 903 that comprises three layers 897, 899 and 901 which are bound together by z-fiber 905. In an embodiment, the gradient in fiber concentration may exist between several layers placed adjacently in a sub-laminate, or between several sub-laminates that are adjacently placed in a preform. In the latter case, each sub-laminate may not have a gradient in fiber concentration, but the gradient will exist between several sub-laminates placed adjacent to one another in the preform. Alternatively, there may be a gradient (in fiber concentration and average void size) between several layers placed adjacently in a sub-laminate and there may also be a gradient (in fiber concentration and average void size) between several sub-laminates in the preform.

2D and 3D Composites

Two dimensional (2D) composites can be manufactured by 2D weaving, 2D braiding, 2D knitting, and so on. 2D woven composites are manufactured by interlacing fibers or tows in a weaving loom. Tows are divided into two components—one termed the warp tow, running along the length of the loom, and the other is the weft tow, running in the cross direction. 2D braids are detailed below in the section on braided preforms.

In an embodiment, three dimensional (3D) ceramic matrix composites use fiber preforms constructed from yarns or tows arranged into complex three-dimensional structures. These can be created from a 3D weaving process, a 3D knitting process, a 3D braiding process, or a 3D lay of short fibers. A matrix and/or matrix precursor material(s) is then infiltrated into the 3D preform to create the composite material. 3D composites are engineered to react to stresses and strains in ways that are not possible with traditional composite materials composed of single direction tows, or two dimensional (2D) woven composites, sandwich composites, stacked laminate materials, or chopped fibers. There are many different types of 3D ceramic matrix composites, a few of which are listed below.

3D Woven Preform 3D woven preforms are produced on a special 3D weaving loom. 3D woven preforms include 3D orthogonal woven preforms and 3D angle-interlock preforms. The architecture of the 3D orthogonal woven preform comprises three different sets of tows; warp tows (y-tows), weft tows (x-tows), and (z-tows). Z-tows are placed in the through-thickness direction of the preform. In 3D orthogonal woven preform there is no interlacing between warp and weft tows and they are straight and perpendicular to each other. On the other hand, z-yarns combine the warp and the weft layers by interlacing (moving up and down) along the y-direction over the weft tow. Interlacing occurs on the top and the bottom surface of the preform.

3D angle-interlock preforms comprises a layup up of several warp layers (longitudinal tows—x tows) one atop the other and interlacing them together with multiple wefts (lateral tows—y tows) in predefined patterns so as to form one thick preform with no identifiable individual layers.

3D layer to layer preforms comprise warp fibers that travel part way through the thickness (tying one layer to the next). There are many other 3D preforms to which this particular disclosure can apply to that are not described herein in the interests of brevity.

3D Braided Preform 3D braided preforms are constructed by the intertwining of two or more yarn systems to form an integral structure. Braided composites are characterized by the organization of their yarns in such a way that they are interlaced diagonally about an axis. Braided preforms for composites consist of two (or more) interlaced sets of tows. Biaxial braids consist of two sets of tows (called bias braids) (not shown) while and triaxial braids include a third set of axial tows (called axial braids) (not shown) in addition to the two sets of braided tows. A variety of shapes can be fabricated for composite applications, from hollow tubular (with in-laid, non-interlaced tows) to solid sections, including I-beams. Unlike woven preforms, braided structures can be directly laid on a three-dimensional mandrel by passing it through the braiding ring and hence producing seamless, near-net shapes.

Braids are generally divided into 2D braids and 3D braids. Two-dimensional braids include flat braids and circular braids. Although the latter represent three-dimensional textiles since they enclose a volume, they comprise a two-dimensional fiber architecture.

Three-dimensional braids, on the other hand, have a three-dimensional fiber architecture. The difference between a 2D braid and 3D braid is that at least one of the tows in the 3D system passes through more than one layer to provide a contiguous and interwoven structure. They are also referred to as integral textiles and are characterized depending on the fiber orientation, the amount of fiber groups, and the integral fiber course of the braid's fibers. The integral fiber course is a useful characteristic feature of 3D braiding. As the fibers cross the entire cross-section of the preform, they intertwine with the various fibers groups and connect the individual layers of the 3D braid. Thus, a delamination of layers in the three-dimensional preform geometry is avoided and this significantly distinguishes 3D braids from 2D braids.

Woven Layer

For purposes of this disclosure the term "woven layers" will broadly cover woven layers, braided layers, knitted layers, or a combination thereof.

Disclosed herein are two dimensional (2D) and three dimensional (3D) preforms and ceramic matrix composites that comprise a plurality of woven layers where the tow diameter and/or the spacing between the tows is varied in different regions (layers) of the preform prior to matrix infiltration. The plurality of woven or braided layers is also sometimes referred to as a laminate.

In an embodiment, the tow diameter and the number of tows is varied from the outermost layer to the innermost layer of the ceramic matrix composite while retaining a constant volume fraction for the tow volume in a unit cell for each layer. While the term tow diameter is used herein, it is to be assumed that tows do not always have a circular cross-sectional area, but have other geometrical cross-sectional areas (e.g., flat, square, and so on). The term "tow diameter" is used synonymously with tow cross-sectional area.

In an embodiment, the tow diameter is systematically reduced from the outermost layer to the innermost layer in a sub-laminate while the number of tows is increased from the outermost layer to the inner most layer of the ceramic matrix composite while retaining a constant volume for the total tow volume in a unit cell (e.g., retaining a constant tow volume fraction in a unit cell) for each sub-laminate. This can be accomplished by changing the filament count in the tows or varying the denier of the tows. This results in a decrease in pore size from the outermost layer to the innermost layer thereby making it easier for matrix precursors to penetrate the interior of the composite and providing a composite with a more uniform matrix density across the thickness of the composite. The larger pores on the outside surfaces of the preform permit easy ingress of matrix precursors into the interior of the composite. The smaller pores in the innermost layers reduce ingress of the matrix precursors further through the preform (i.e., from the innermost layers to the second surface). This results in a more uniform distribution of the matrix in the ceramic matrix composite resulting in uniform stress distribution, lower porosity, higher damage tolerances.

In an embodiment, the preform (to manufacture the 2D or 3D ceramic matrix composite) comprises a plurality of different sub-laminates where each succeeding sub-laminate has a smaller average pore size than the sub-laminates preceding it. In an embodiment, the outermost sub-laminates of the preform have the largest average pore size while the innermost sub-laminates have the smallest average pore size. The intermediate sub-laminates between the outermost sub-laminates and the innermost sub-laminates have average pore sizes that lies between those of the outermost and innermost sub-laminates. In other words, there may be a plurality of gradients in a preform that comprises a plurality of sub-laminates.

In another embodiment, each sub-laminate in the preform used to manufacture the 2D or 3D ceramic matrix composite comprises a plurality of different layers where each succeeding layers (or plurality of layers) has a smaller average pore size than the layer or plurality of layers preceding it. In an embodiment, the outermost layers (or outermost plurality of layers) of the sub-laminate have the largest average pore size while the innermost layers (or plurality of innermost layers) of the sub-laminate have the smallest average pore size. The intermediate layers between the outermost layers and the innermost layers of the sub-laminate have average pore sizes that lie between those of the outermost and innermost layers (or plurality of outermost and innermost layers). In other words, there may be a plurality of gradients in a sub-laminate that comprises a plurality of layers.

In an embodiment, there is a systematic gradient in the tow diameter, the number of tows and the average pore sizes because of a systematic reduction in the tow diameter and the systematic increase in the number of tows from the outermost layer to innermost layer of the sub-laminate. In another embodiment, there is a systematic gradient in the average tow diameter, the average number of tows and the average pore sizes because of a systematic reduction in the tow diameter and the systematic increase in the number of tows from the outermost sub-laminate to innermost sub-laminate of the preform. In another embodiment, there is an average gradient in the tow diameter, the number of tows and the average pore sizes from outermost layer to innermost layer despite the lack of a systematic reduction in the tow diameter and the number of tows from one layer to another. In another embodiment, there is an average gradient in the tow diameter, the average number of tows and the average pore sizes from outermost sub-laminate to innermost sub-laminate despite the lack of a systematic reduction in the tow diameter and the number of tows from one sub-laminate to another.

Figure 2A:
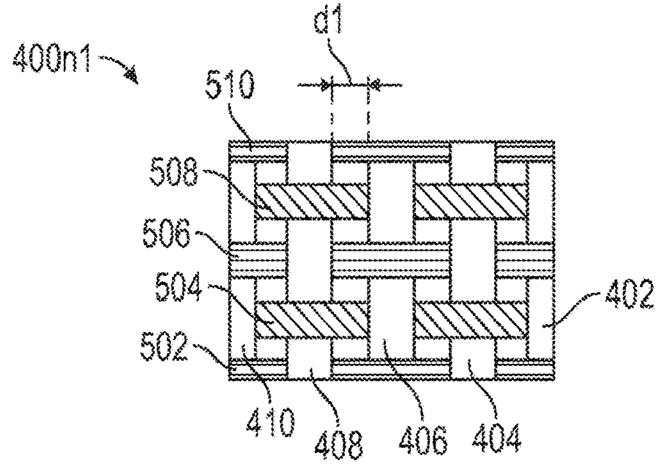
FIG. 2A depicts a top view of the first unit cell of a preform.
Figure 2B:
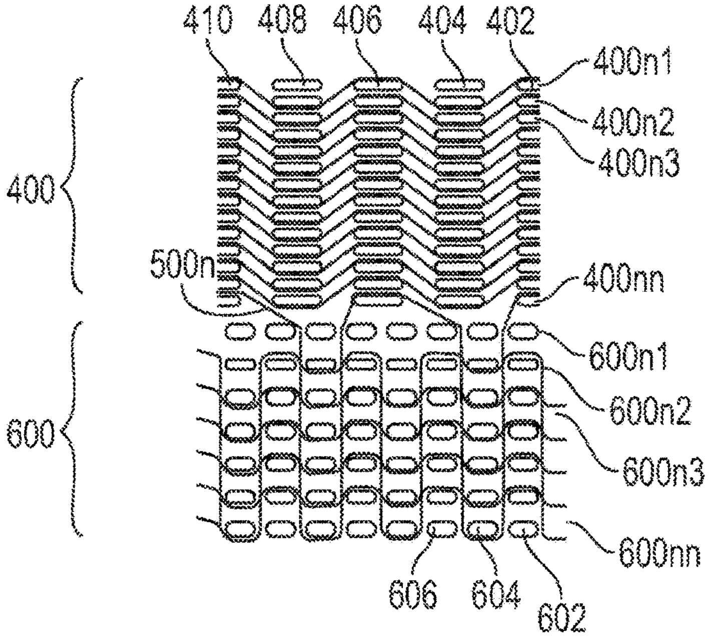
FIG. 2B depicts a side view of the first unit cell of first layer that lies atop the second unit cell of the second layer.
Figure 2C:
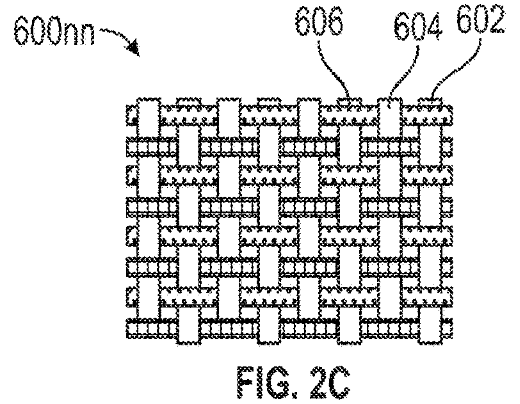
FIG. 2C depicts a bottom view of the second unit cell of the preform.

FIGS. 2A, 2B and 2C depict one embodiment of a unit cell of a preform that comprises two sub-laminates—a first sub-laminate 400 and a second sub-laminate 600 (having two unit cells 400 and 600). In an embodiment, the first sub-laminate 400 is an outermost sub-laminate while the second sub-laminate 600 may or may not be an outermost sub-laminate. In an embodiment, the second sub-laminate may be a sub-laminate that is located at an interior of the preform. FIG. 2A depicts a top view of the unit cell 400, while the FIG. 2C depicts a bottom view of the unit cell 600. FIG. 2B depicts a side view of the unit cell 400 (from first sub-laminate 400) that lies atop the unit cell 600 (from the second sub-laminate 600). For purposes of argument (with reference to the FIGS. 2A, 2B and 2C), each unit cell is assumed to be 1 cubic inch. In practice, the unit cell can be any size so long as it encompasses a repeatable unit that translates across space through a cross-section of the preform. For example, a unit cell taken in the first sub-laminate 400 is to be identical (i.e., it encompasses tows in the same position) to a neighboring unit cell in the same sub-laminate. A second unit cell taken in an adjacent sub-laminate (e.g., the second sub-laminate 600) has the same dimensions (length, width and height) as the first unit cell of the first sub-laminate 400, even though the tow positions in the second unit cell are different from the positions of tows in the first unit cell. In addition as stated above, the total tow volume in every unit cell is the same irrespective of the sub-laminate (e.g., 400, 600, and so on).

With reference now again to the exemplary embodiment depicted in the FIG. 2B, the first unit cell 400 (in first sub-laminate 400) comprises a plurality of layers 400$n_1$, 400$n_2$, 400$n_3$ . . . and so on, to 400$n_n$. Each layer comprises 5 fill tows 402, 404, 406, 408 and 410 and 5 warp tows 502, 504, 506, 508 and 510. Since 1 fill tow and 1 warp tow will be shared with a neighboring unit cell (not shown), each layer in the unit cell (400$n_1$, 400$n_2$, 400$n_3$ . . . and so on, to 400$n_n$) contains 4 warp tows and 4 fill tows for a total of 8 tows. The tows in each of the layers (termed first layers in the unit cell 400) have a first tow spacing between successive tows. Each of the layers will also have an average first pore size (the spaces between successive tows is termed a pore).

In the second unit cell 600, which contacts the unit cell 400 at its (unit cell 400$s$) lower surface, the 4 warp tows and 4 fill tows are each split into two tows and distributed uniformly across the 1 cubic inch of the unit cell. While the FIG. 2B depicts all of the 4 warp tows and 4 fill tows in the second unit cell 600 as being split into two, it is to be noted that it is possible to split either the 4 warp tows or the 4 fill tows into two. In other words, not all of the warp tows and all of the fill tows in any given layer need to be split in order reduce pore size. It is also not necessary to split both warp and fill tows equally. They may be split unequally so long as the tow volume fraction remains unchanged in the first and second unit cells.

Each layer of the unit cell 600 thus contains 16 tows (compared with 8 tows per layer in unit cell 400). The unit cell 600 thus contains second layers with a second tow spacing that is lower than the first tow spacing of the unit cell 400. The second average pore sizes contained in the second layers (of the second unit cell 600) is smaller than the first average pore sizes of the first unit cell 400. The tow diameter of the first unit cell 400 is greater than the tow diameter of the second unit cell 600. The total volume occupied by the tows in the unit cell 600 is however the same as that in the unit cell 400. However, the pore sizes are greatly decreased because of the presence of a larger number of tows in the first unit cell 400 as compared with the second unit cell 600. This can be seen in the FIG. 2C (the bottom view of the second unit cell 600) which depicts the spacing between the warp and fill tows in the lowest layer 600$n_n$ of the second unit cell 600. Comparing the spaces between the warp and fill fibers in the FIG. 2A with the spaces in the FIG. 2C, it may be seen that the pore sizes decrease with the increase in the number of tows (in the unit cell) even though the tow content (the tow volume) in both of the unit cells is identical. From the FIGS. 2A and 2C, it may be seen that the tows in the layers 400 and 600 are uniformly spaced, i.e., they are periodically spaced.

While the FIGS. 2A, 2B and 2C depict two sub-laminates 400 and 600 in the preform, it is possible to have more than two sub-laminates in such composites. A preform and hence a 2D or 3D ceramic matrix composite may have 3 or more sub-laminates, 5 or more sub-laminates and 10 or more sub-laminates up to a total of 100 sub-laminates. A 3D ceramic matrix composite generally has a z-fiber that traverses the composite (through two or more sub-laminates) in the thickness direction. Each sub-laminates will preferably have a larger number of tows when compared with the preceding sub-laminate from the outermost sub-laminate to the innermost sub-laminate. In an embodiment, the number of tows may be increased in a series progression from one sub-laminate to another. The progression chosen will determined the increase in the number of tows from one sub-laminate to another which will in turn determine the decrease in porosity. Useful progressions are geometric progressions and arithmetic progressions.

In an embodiment, each sub-laminate may have 3 or more layers, 5 or more layers, 10 or more layers up to a total of 100 layers, where each layer will preferably have a larger number of tows when compared with the preceding layer from the outermost layer to the innermost layer. In an embodiment, the number of tows may be increased in a series progression from one layer to another. The progression chosen will determined the increase in the number of tows from one layer to another which will in turn determine the decrease in porosity. Useful progressions are geometric progressions and arithmetic progressions.

While in the FIG. 2B, it may be seen that the tows in the first unit cell 400 and in the second unit cell 600 are uniformly spaced apart from one another, it is possible to vary average pore size by changing the spacing of the tows in the unit cell (while keeping tow volume the same).

In summary, the FIGS. 2A through 2C depict a 2D or 3D preform comprising a first sub-laminate 400 (having first unit cell 400) comprising a plurality of first layers and a second sub-laminate 600 (having second unit cell 600) comprising a plurality of second layers. The first sub-laminate comprises a first unit cell comprising a first volume fraction of tows, where the first volume fraction of tows comprise first tows having a first tow spacing between successive first tows. The second sub-laminate comprises a second unit cell comprising a second volume fraction of tows, where the second volume fraction of tows comprise second tows having a second tow spacing between successive second tows. The first volume fraction of tows in the first unit cell is equal to the second volume fraction of tows in the second unit cell. The second tow spacing is less than the first tow spacing.

In an embodiment, the first tow spacing produces a first average pore size and where the second tow spacing produces a second average pore size, where the first average pore size is greater than the second average pore size.

Figure 3B:
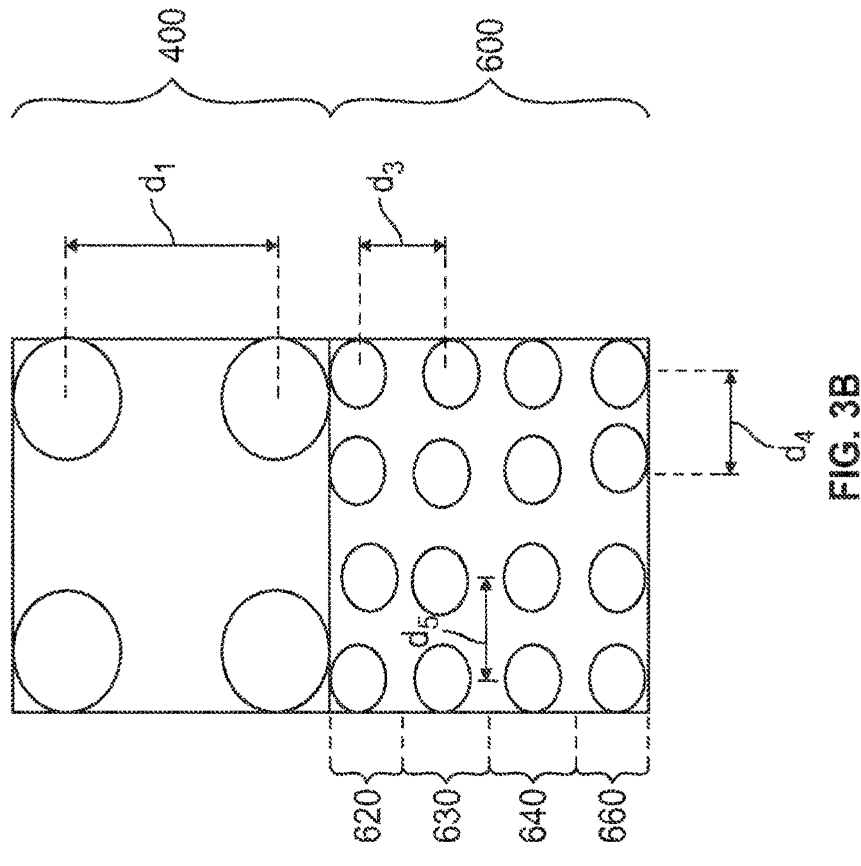
FIG. 3B depicts another side view of the first unit cell of first layer that lies atop the second unit cell of the second layer where some of the tows in the second unit cell are randomly spaced.
Figure 3A:
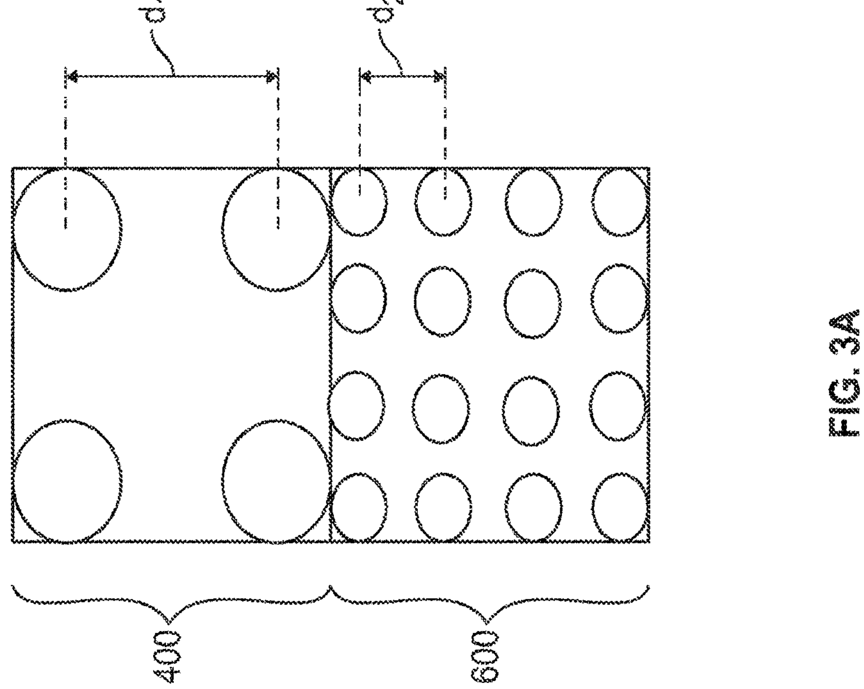
FIG. 3A depicts another side view of the first unit cell of first layer that lies atop the second unit cell of the second layer where all tows are uniformly spaced.

FIGS. 3A and 3B depict two embodiments—a first embodiment (FIG. 3A), where the spacing between tows is kept constant in the unit cell and a second embodiment (FIG. 3B), where the spacing between tows is varied (i.e., the tows are aperiodically spaced) while retaining unit cell size and tow volume within a unit cell.

FIGS. 3A and 3B show only the fill tows (and not the warp tows) in the interests of clarity. In the FIG. 3A, the first unit cell 400 (which would lie in the first layer 400) contains 4 fill tows where each tow is uniformly spaced at a distance $d_1$ from a neighboring tow. The average tow spacing is $d_1$ for unit cell 400. In the second unit cell 600, which contains a larger number of tows (16 tows) while having the same tow volume (i.e., the volume fraction is the same) as the first unit cell 400, the tows are again uniformly spaced at a distance $d_2$. The distance $d_2$ is smaller than distance $d_1$ because of the larger number of tows in unit cell 600 compared with the number of tows in unit cell 400.

In the FIG. 3B, the distance between tows in the second unit cell 600 are varied and are not uniform (when compared with the tow distance in the second unit cell 600 of FIG. 3A). In the first unit cell 400 of the FIG. 3B, the tows are spaced in a similar manner to that of the FIG. 3A, and the average spacing $d_1$ is the same as that of the FIG. 3A. In the second unit cell 600 of the FIG. 3B, the tows are variably spaced at distances of $d_3$, $d_4$ and $d_5$ (while maintaining the tow volume in the unit cell). In the FIG. 3B, the tows in the layers 620 and 660 are arranged to have different tow spacings from that of the tows in the layer 640. The layer 640 has tow spacing $d_3$ retained at the original distance $d_2$ (as in the FIG. 3A for unit cell 600), while the tow spacing in layers 620 and 660 is reduced from $d_2$ to $d_4$. The tow spacing between some tows in layers 620 and 630 is also changed from $d_2$ to $d_5$. The tow spacing in the second unit cell 600 is therefore an average of the distances $d_3$, $d_4$ and $d_5$ divided by the number of tows (in this case 16 tows). Since $d_4$ and $d_5$ are less than $d_2$, it may be seen that the average pore size in the unit cell 600 in the FIG. 4B is the same as the average pore size in the unit cell 600 in the FIG. 4A.

From the FIGS. 2A through 2C and 3A through 3B, it may be seen that the first average pore sizes of selective layers may be changed by increasing or decreasing the number of tows in the layer (compared with the number of tows in an adjacent layer) or alternatively, by changing both the number of tows and the spacing between the tows in the layer (compared with the number of tows in an adjacent layer). The tows may be uniformly spaced or randomly spaced so long as the tow volume in a unit cell is maintained constant.

Neighboring sub-laminates (e.g., first sub-laminate 400 and second sub-laminate 600 in the FIG. 2B) may be joined together, by permitting warp tows from one sub-laminate to interpenetrate the fill tows of a neighboring sub-laminate. In the FIG. 2B, the warp tow **500*n* traverses both the first sub-laminate 400 and the second sub-laminate 600 thus joining the first sub-laminate to the second sub-laminate prior to matrix infiltration. In another embodiment, warp tows (not shown) from the second sub-laminate may also penetrate the first sub-laminate (not shown) and then repenetrate the second sub-laminate to join the first sub-laminate to the second sub-laminate. In an embodiment (not shown), a plurality of z-fibers (not shown) may penetrate the first sub-laminate 400 from the second sub-laminate 600 and/or penetrate the second sub-laminate 600 from the first sub-laminate 400** to join the first sub-laminate to the second sub-laminate. Binders used to help shape the preform and/or matrix infiltration later in the process can further secure joining of the first layer to the second layer. This will be described later.

Figures 4A, 4B:
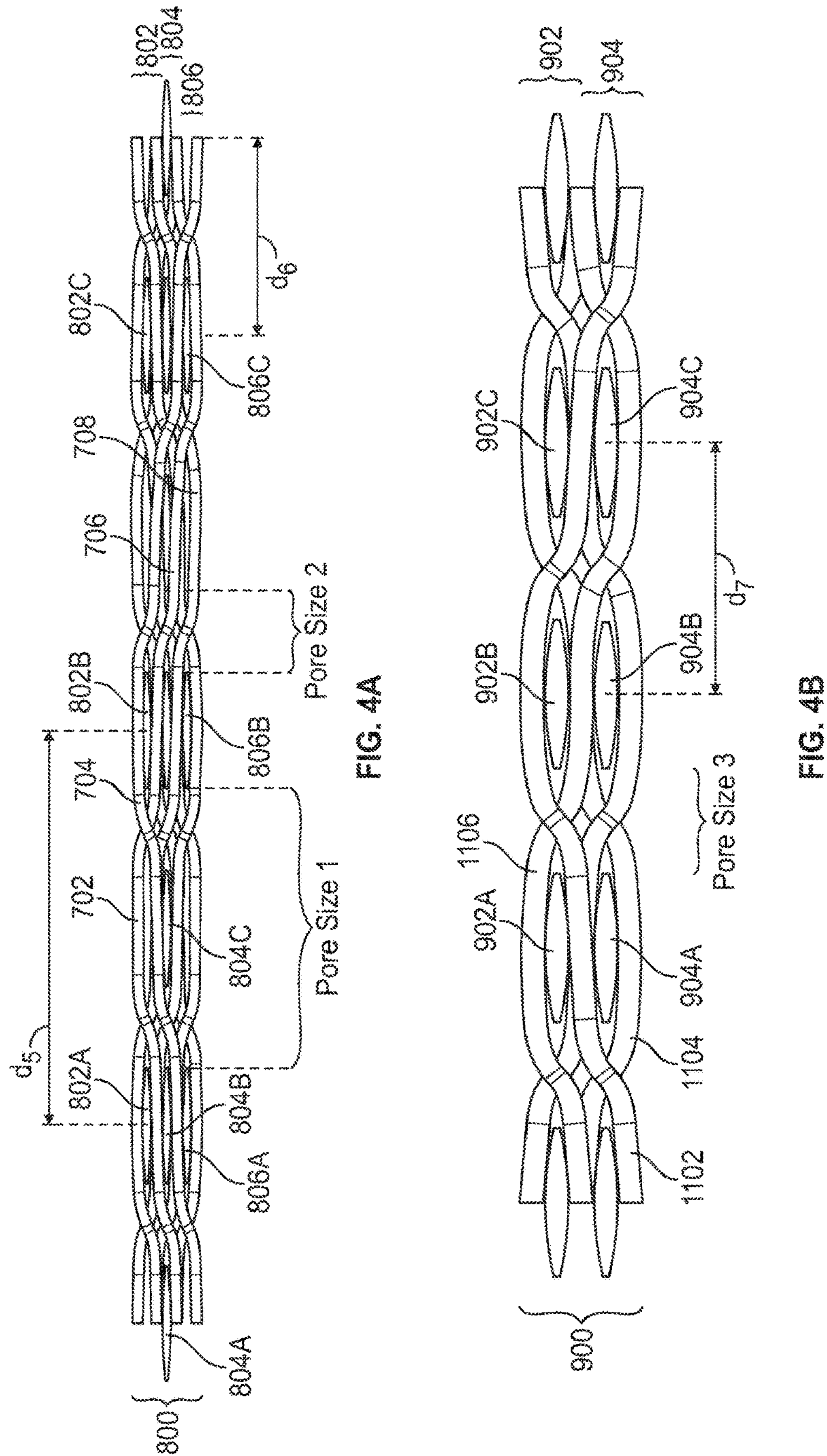
FIG. 4A depicts a method of increasing average pore size by varying spacing between some of the tows in a preform.
FIG. 4B depicts a method of creating uniform pore size by keeping tow spacing uniform in a layer of a preform.

FIGS. 4A and 4B depict another manner of varying pore size in the different sub-laminate 800 and 900 respectively that are used in a preform (and hence in the resulting ceramic matrix composite). In this embodiment, the unit cells in different layers do not have a constant volume fraction of tows in different layers. By varying the spacing between the tows in different layers, the pore spacing in different layers (and hence in the sub-laminate) can be varied. While the sub-laminate 800 and 900 in the FIGS. 4A and 4B respectively are not depicted to be in contact with each other, they can be assumed to contact each other directly or indirectly through other layers in a preform. The FIG. 4A depicts a sub-laminate 800 that contains layers 802 (having fill tows 802A, 802B, 802C, and so on), 804 (having fill tows 804A, 804B and 804C) an 806 (having fill tows 806A, 806B and 806C) respectively. The fill tows are woven with warp tows 702, 704, 706 and 708.

By varying the spacing between the fill and/or warp tows in different layers, the average pore size in different layers can be varied. For example, in layer 802 the first spacing between successive fill tows is $d_5$ while in the layer 804 the spacing (called a second spacing) between successive fill tows is $d_6$ (which is less than $d_5$). It is to be noted that while the FIGS. 4A and 4B display single layers for layer 802, 804 and 806, each of these layers can comprise one or more layers to form a sub-laminate with a plurality of layers greater than the three layers depicted herein. This is detailed later. The presence of two different spacings (a first spacing and a second spacing) between tows in adjacent layers facilitates the presence of different average pore sizes in the sub-laminate 800. The combination of spacings $d_5$ and do in the sub-laminate 800 leads to a first pore size (pore size 1) that is greater than the pore size (pore size 2) afforded by just the spacing $d_5$. In an embodiment, the first spacing $d_5$ is a periodic spacing and the second spacing do is also a periodic spacing. However, because of the presence of multiple spacings between the fill and warp tows in the sub-laminate 800, a variety of different pore sizes may be obtained. The average pore size will be an average of the pore sizes obtained by the different spacings selected for the different fill and warp tows.

The FIG. 4B depicts a sub-laminate 900 having two layers 902 and 904 having fill tows 902A, 902B, 902C and so on, and fill tows 904A, 904B, 904C, and so on, respectively. In the FIG. 4B, it may be seen that the spacing between the individual fill tows 902A and 902B is equal to the spacing between fill tows 902B and 902C and is maintained at a constant value of $d_7$. In other words, the spacing between all fill and warp tows in maintained at a constant value unlike the sub-laminate 800 depicted in the FIG. 4A where there are different spaces between the fill and warp tows in different layers. As a result, the pore size 3 between the tows in the FIG. 4B is therefore constant value determined by the distance $d_7$. While the sub-laminate 900 is depicted as having uniform pore sizes, it can also have variable pore sizes.

The sub-laminates 800 and 900 of the FIGS. 4A and 4B can be next to one another or separated by other layers or sub-laminates (not shown). However, by combining the two sub-laminates into one preform, composite (articles) having a gradient in pore sizes can be produced prior to matrix infiltration. As noted above, the different sub-laminates can be joined (prior to matrix infiltration) to each other by using warp and/or z-fibers that traverse both sub-laminate 800 and 900. This has been depicted in the FIG. 2B and can be used in other forms of the preform. The arrangement of sub-laminate 800 and 900 (from FIGS. 4A and 4B respectively) with respect to each other in a preform can be varied depending upon the desired gradients in pore sizes.

In an embodiment, when layer 800 is contacted with layer 900 to form the preform, it is desirable for the average pore size of the layer 800 to be different from the average pore sizes of the layer 900. When the layer 800 is disposed atop the layer 900, there is a gradient in pore sizes when the average pore size of the layer 800 is larger than the average pore size of the layer 900. This gradient in pore sizes may be used to promote precursor infiltration during the formation of the ceramic matrix composite.

While the FIG. 4A depicts a single layer 804 disposed between two layers 802 and 806, it is to be noted that a first layer 800 (not shown) may have a first plurality of layers each having the structure of layer 802, a second plurality of layers each having the structure of layer 804 and a third plurality of layers each having the structure of layer 806 disposed adjacent to each other. This first plurality of layers 800 each having the structure of layer 802 can contact a second plurality of layers each having the structure of layer 804 which can contact a third plurality of layers each having the structure of layer 806 as seen in the FIG. 4A. This first sub-laminate 800 with multiple layers each having the structure of layers 802, 804 and 806 may contact a second sub-laminate having the structure of second sub-laminate 900 (detailed below). When the first sub-laminate 800 having multiple layers (as described above) contacts the second sub-laminate (also having multiple layers) to form a preform, it is desirable for the first sub-laminate to have a different average pore size from the second sub-laminate. This gives rise to a gradient in pore sizes in the preform. If the first sub-laminate 800 is the outer sub-laminate it is generally desirable for it to have a larger average pore size than the average pore size of the second sub-laminate 900.

In the embodiment, depicted in the FIGS. 4A and 4B, while there is a gradient in pore sizes from sub-laminate 800 to sub-laminate 900, there is reversed gradient with sub-laminate 800. For example, the average pore size is reduced from layer 802 (or plurality of layers 802) to layer 804 (or plurality of layers 804). This produces a first gradient having a first slope. This gradient is pore sizes is increased from layer 804 (or plurality of layers 804) to layer 806 (or plurality of layers 806). This produces a second gradient having a second slope, where the second slope has a different coefficient (negative) from the first gradient which has a positive slope. In other words, the sub-laminate 800 can have two gradients in pore size that have opposing slopes.

In this manner it is possible to combine different layers in a sub-laminate, where the coefficient that accompanies the gradient can vary from positive to negative and vice versa. The coefficient that accompanies the gradient (i.e., the slope of the gradient) can be varied in a sub-laminate so long as the overall gradient in pore size or fiber concentration in the preform is unidirectional. The use of gradients (with varying directions or coefficients or opposing slopes) leads to formation of non-symmetrical preforms.

In summary, from the FIGS. 4A and 4B, a 2D or 3D preform may comprise a first sub-laminate a second sub-laminate. The first sub-laminate 800 comprises a first plurality of first layers 802, 804, 806, and so on, where at least one layer of the first plurality of first layers comprises a first spacing $d_5$ between successive first tows (in layers 802 or 806) that is different from a second spacing $d_6$ between successive second tows in an adjacent first layer 804. The first sub-laminate has a first average pore size (the average of pore size 1 and pore size 2). The second sub-laminate comprises a second plurality of second layers 902 and 904. Each layer of the second plurality of second layers has a third spacing $d_7$ between successive tows. The second sub-laminate has a second average pore size "pore size 3" that is less than the first average pore size. At least one of the first sub-laminate or the second sub-laminate has at least two gradients in porosity that have opposing slopes (e.g., the gradient in porosity between layers 802 and 804 is opposed to the gradient between layers 804 and 806). The first average pore size is determined by the average of pore size 1 and pore size 2.

When a uniform matrix density is desired throughout the composite, the outer layers (or outer sub-laminates) typically has a larger average pore size while the inner layers (or inner sub-laminates) have a lower average pore size as compared with that of the outer layers (or outer sub-laminates). The larger average pore size in the outer layers (or outer sub-laminates) of the preform facilitates ingress of the matrix precursors into the interior of the composite where the pore sizes are smaller (and where it is typically more difficult for the matrix precursors to infiltrate). This arrangement facilitates a uniform matrix density distribution as compared with arrangement where average pore sizes are uniform throughout the composite prior to matrix infiltration. In a typical set up, the pores in the outer layers (or outer sub-laminates) tend to get filled first and create blockages thus preventing further ingress of the matrix precursors into the interior causing the interior to contain voids. This problem is avoided by using layers (or sub-laminates) having varying porosity. Using outer layers (or outer sub-laminates) that have a greater porosity and greater average pore sizes than the interior layers (or interior sub-laminates) facilitates matrix precursor ingress into the interior of the composite ceramic matrix thus providing for a uniform matrix density.

Figure 5:
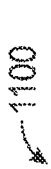
FIG. 5 depicts a preform that contains symmetrically arranged layers where the outermost layers have a higher average pore size than the innermost layers.
Figure 5:
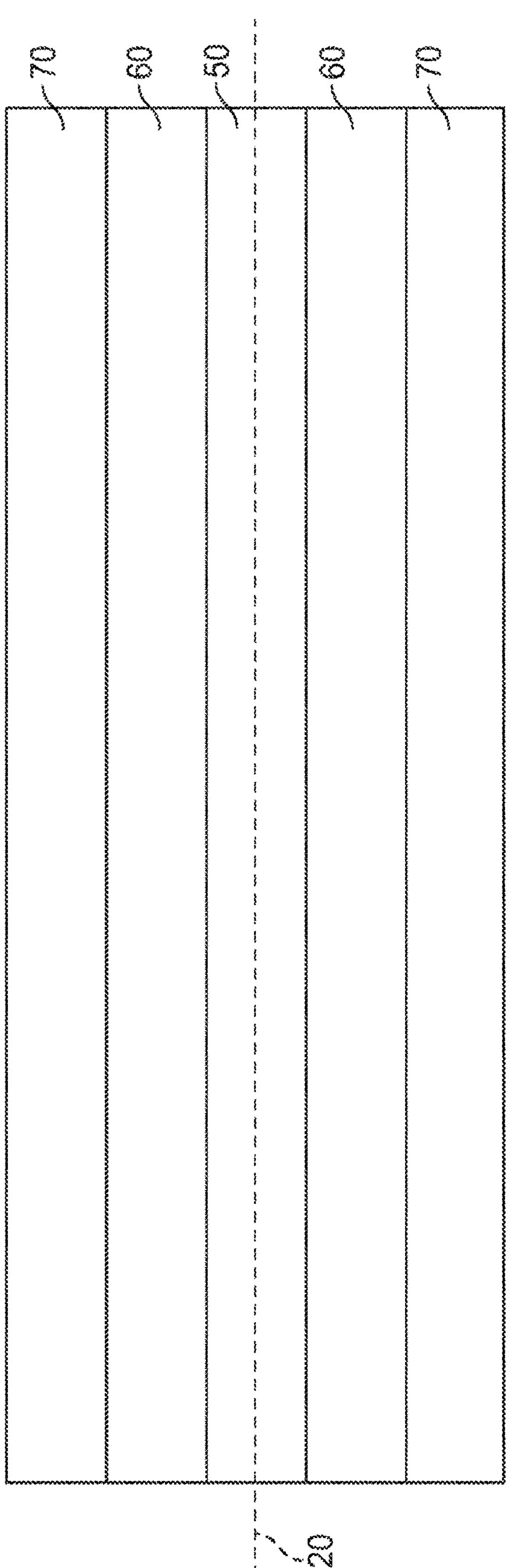

FIG. 5 depicts one arrangement of a preform 1100 that has different sub-laminates of different average pore spacings prior to matrix infiltration to form the ceramic matrix composite. The preform 1100 contains 5 sub-laminates 50, 60 and 70 arranged symmetrically about axis 120. There are two outer sub-laminates 70 having average pore sizes that are greater than average pore sizes in the sub-laminates 60 which lie between innermost sub-laminate 50 and the outermost sub-laminate 70. The average pore size in the sub-laminate 60 is lower than the average pore size in the sub-laminate 70, while the average pore size in the sub-laminate 50 is lower than the average pore size in the sub-laminates 60. This use of diminishing average pore size (i.e., the use of a gradient in pore size) from the outermost sub-laminate to the innermost sub-laminate permits matrix precursor infiltration into the interior by delaying pore blockage in the outermost layers (because of the larger pore sizes in the outermost sub-laminates). The arrangement of larger pore sizes from the outermost sub-laminate 70 to the innermost sub-laminate 50 may be arrived at by the arrangement depicted in the FIGS. 2A through 2C, FIGS. 3A and 3B and FIGS. 4A and 4B.

A z-fiber may be used to join the sub-laminates 50, 60 and 70 together. It is to be noted that each sub-laminate 50, 60 and/or 70 can comprises one or more layers, where each plurality of layers may have varying pore sizes as detailed above. In an embodiment, each sub-laminate comprises a plurality of layers, where each plurality of layers may have a gradient in pore sizes or a plurality in tow spacing.

Figure 6:
FIG. 6 depicts another arrangement of a preform having different layers having different average pore sizes (not shown)
Figure 6:
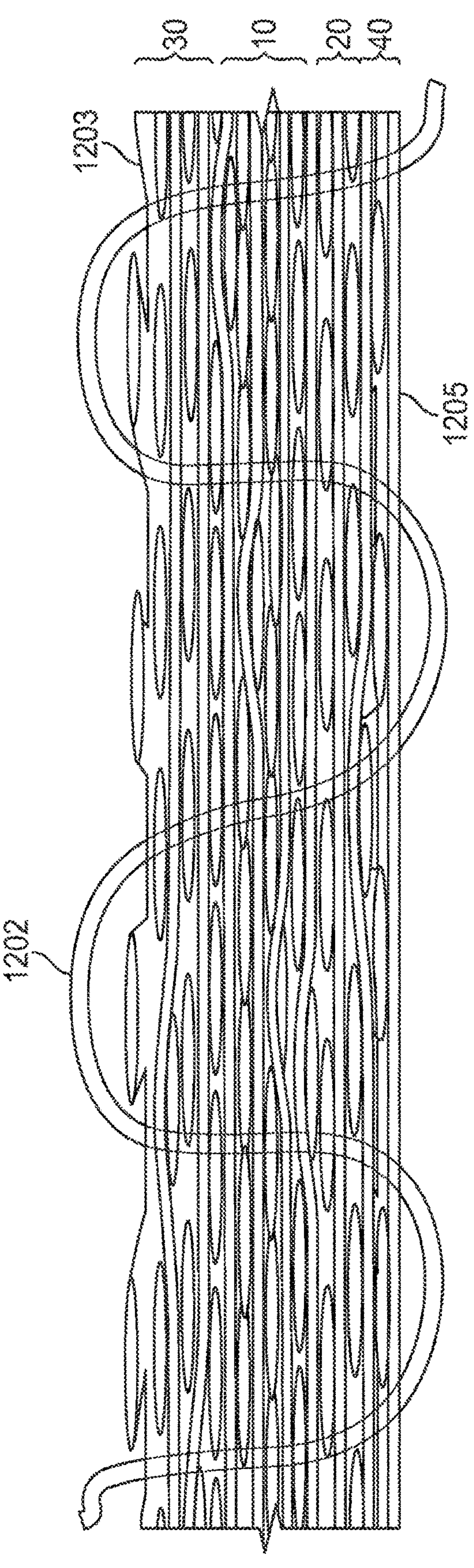

FIG. 6 depicts another arrangement of a preform 1200 having different sub-laminates 10, 20, 30, and 40 having different average pore sizes (not shown). FIG. 6 depicts preforms with a non-symmetric distribution of layers or sub-laminates (where the layers or sub-laminates have gradients in pore size and fiber concentration). Each sub-laminate may contain one or more layers. In this arrangement, a cross section of a preform shows an interior portion 10 that has pores that are smaller than those shown in exterior portions 20, 30 or 40. The interior portion 10 is closer to surface 1203 than surface 1205 and thus the layers containing the lowest pore size are not at the mid-plane of the composite. Additionally, between sub-laminate 10 and surface 1205 there are two sub-laminates 20 and 40 with different average pore sizes whereas there is only 1 sub-laminate (sub-laminate 30) between sub-laminate 10 and surface 1203. Additionally, in some cases sub-laminate 30 may not be present (it may be optional) which would put the sub-laminate with the lowest pore size to be present at surface 1205. In other cases, sub-laminate 30 may have the same pore size as one or both of sub-laminates 20 and 40. These non-symmetric preforms may be desirable for certain geometries or processing conditions. Non-symmetric preforms (preforms having a non-symmetric distributions of sub-laminates or sub-layers) may be used to regulate the ingress of precursors during the manufacturing processes. They may be advantageously used to promote precursor flow to one portion of the preform (for a period of time) over another portion of the preform during the formation of the ceramic matrix composite. They may also be used to regulate matrix densities in different portions of the preform.

The arrangement of different pore sizes may be accomplished in a manner similar to that described in the FIGS. 2A through 2C, FIGS. 3A and 3B or FIGS. 4A and 4B. These methods will not be discussed again in the interests of brevity. A z-fiber 1202 may be woven through the preform 1200 prior to matrix infiltration and the formation of the ceramic matrix composite. The z-fiber facilitates holding the various layers together to form a structurally stable 3D preform. 2D preforms do not have z-fibers that are woven through the preform.

Figures 7A, 7B, 7C:
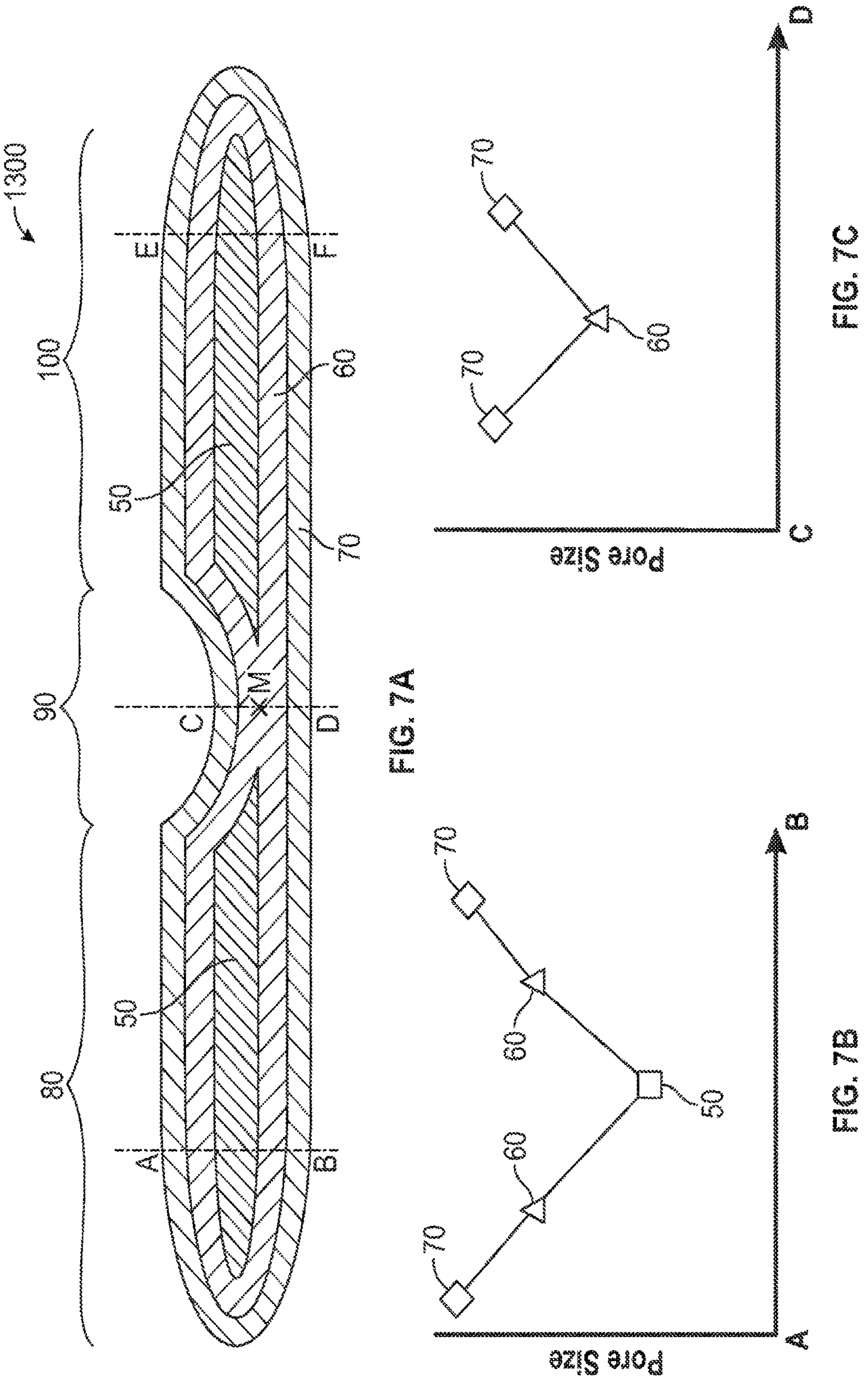
FIG. 7A is a cross section of a preform having various layers each having a different average pore size from its neighboring layers.
FIG. 7B is a graph depicting the gradient in pore sizes across section AB of the preform of the FIG. 7A.
FIG. 7C is a graph depicting the gradient in pore sizes across section CD of the preform of the FIG. 7A.

FIG. 7A is a cross section of a preform 1300 having various sub-laminates each having a different average pore size from its neighboring sub-laminates. The preform 1300 comprises two exterior regions 80 and 100, which are in contact with each other via a central region 90. The region 90 is has a different thickness than 80 and 100. Each exterior region 80 and 100 has three sub-laminates—a first sub-laminate 50 (also called a core sub-laminate) that forms a core for each exterior region, a second sub-laminate 60 disposed on and in contact with the core sub-laminate 50 and a third sub-laminate 70 that is disposed on an outer surface of the second sub-laminate 60 and in contact with it. The third sub-laminate completely surrounds the second sub-laminate and the second sub-laminate encompasses the core sub-laminate. In an embodiment, the exterior region 100 is a mirror image of the exterior region 80. Exterior region 100 contacts exterior region via a central region 90 that comprises the third sub-laminate 70 and the second sub-laminate 60. The third sub-laminate 70 contacts the second sub-laminate 60 on an outer surface of the second sub-laminate 60.

The third sub-laminate 70 thus forms an exterior sub-laminate that forms the periphery of the preform and surrounds the second sub-laminate 60 and contacts along the entire outer surface of the second sub-laminate 60. The second sub-laminate 60 encircles the two core sub-laminate portions 50, each of which form the core of the two exterior regions 80 and 100.

The third sub-laminate 70 comprises pores of a first size, while the second sub-laminate 60 comprises pores of a second size (that is different from the pores of the first size). The first core sub-laminate 50 has pores of a third size that is different from the pores of the first size and the second size.

In an embodiment, the third sub-laminate 70 has the largest average pore size, while the first core sub-laminate 50 has the smallest average pore size and the second sub-laminate has an average pore size that lies between that of the third sub-laminate 70 and the first core sub-laminate 50. The gradient in pore sizes along section AB (which is taken in the first region 80) in the exterior region 80 is shown in the graph FIG. 7B, where the average pore sizes in third sub-laminate 70, second sub-laminate 60 and core sub-laminate 50 along section line AB are plotted from A to B. The numerals in the FIG. 7B identify the respective sub-laminate 70, 60 and 50. Since the thicknesses of the sub-laminates 70 and 60 are assumed to be uniform across the entire preform, the gradient in pore size from the layer 70 to core layer 50 and back to layer 70 is symmetrical. It should also be noted that the slopes of the gradients seen in the FIG. 7B are opposed to each other. The gradient in exterior region 100 along section EF (which is taken in the third region 100)

is not plotted since it is expected to be a mirror image of the gradient in exterior region 80. If however, the exterior region 80 is not a mirror image of the exterior region 100, then the gradient along section EF will not be identical to the gradient along section AB. This would lead to the preform 1300 having asymmetrical gradients in the opposing exterior regions 80 and 100. While the preform 1300 is depicted as having three regions 80, 90 and 100, it may comprise more or less than the 3 depicted regions each of which have different gradients in pore sizes. Similarly, it may comprise more or less than the three sub-laminates 50, 60 and 70 depicted herein, each of which may have uniform pore sizes or alternatively, have a gradient of average pore sizes.

The gradient in pore sizes along section CD, which is taken in the second or central region 90 is shown in the graph FIG. 7C, where the average pore sizes in third sub-laminate 70 and second sub-laminate 60 are plotted along section line CD from C to D. If the center point M of the preform along line CD is equidistant from points C and D on the third sub-laminate 70 outer surface, then the pore density gradient (or fiber density gradient) as plotted along line CD will also be symmetrical. If the center point M of the preform along line CD is not equidistant from points C and D on the third sub-laminate 70 outer surface, then the density gradient along line CD will not be symmetrical. As illustrated in FIG. 7A-C, the region 90 has a thinner cross-section than regions 80 and 100 it may be desirable to intentionally have a different porosity gradient than thicker regions. This variation of gradients in adjacent regions of different thicknesses can help the CMC achieve a more uniform bulk density leading to more homogeneous material. Alternatively, it could be utilized to intentionally create a less homogeneous material.

It is to be noted that the sub-laminates 50, 60 and/or 70 may comprise one or more layers having a single average pore size or alternatively have a gradient in average pore sizes. For example, the third sub-laminate may have a plurality of layers each of which have a uniform average pore size or alternatively, each of which have a different average pore size (leading to a gradient in pore sizes). This may or may not be the case for sub-laminates 50 and 60. It is possible for one or more sub-laminates in such a preform (as that depicted in the FIG. 7) to have a gradient in average pore sizes, while the other sub-laminates do not have a gradient. However, when a section across the preform is taken (such as section AB or EF detailed above), there will be a gradient across the section. This gradient may be symmetrical or asymmetrical.

When each of the sub-laminates 50, 60 and 70 comprise a plurality of layers each having a uniform average pore size (but where the uniform average pore sizes in the layers of each of the sub-laminates are different from each other), a gradient in average pore sizes is produced across any cross-section (such as, for example section AB or EF) of the preform 1300. It is also submitted, that the thickness of the sub-laminates 50, 60 and 70 may vary at different regions of the preform 1300. For example, the sub-laminate 60 has a different thickness in exterior regions 80 and 100 than it has in the central region 90. There may be multiple regions in a sub-laminate with thickness variations. These variations in thickness will produce gradient variations from one sub-laminate to another and will also produce a change in the rate of gradient variation from one sub-laminate to another.

In summary, the FIGS. 7A through 7C depict a 2D or 3D preform 1300 comprises a first region 80 and a second region 90. The first region 80 comprises one or more first sub-laminates 50, 60 and 70; wherein the one or more first sub-laminates comprise a first gradient in average pore size along a first cross-section AB of the preform 1300, where the first cross-section AB of the preform is located in the first region 80. The second region 90 contacts the first region 80. The second region 90 comprises one or more second sub-laminates 60, 70. The one or more second sub-laminates 60, 70 comprise a second gradient in average pore size along a second cross-section CD of the preform 1300. The second gradient in average pore size is different from the first gradient in average pore size. The first region 80 has a different thickness from the second region 90. The second cross-section CD is located at the second region 90 and the second region is not the same as the first region. It is to be noted, that some of the first sub-laminates are co-continuous with some of the second sub-laminates. In the FIG. 7A, first sub-laminates 60 and 70 are co-continuous with second sub-laminates 60 and 70.

In an embodiment, the 2D or 3D preform 1300 further comprises a third region 100 that comprises one or more third sub-laminates 50, 60, 70. The one or more third sub-laminates 50, 60 and 70 comprise a third gradient in average pore size along a third cross-section EF of the preform. The third gradient in average pore size is different from at least one of the first gradient or the second gradient. In an embodiment, the third gradient in average pore size is the same as the first gradient in average pore size but is different from the second average pore size. The third cross-section is located at the third region 100. It is to be noted that each of the sub-laminates may contain a plurality of layers, where a gradient in pore size or of fiber concentration may exist in each sub-laminate. It is to be noted, that some of the first sub-laminates are co-continuous with some of the second sub-laminates and with some of the third sub-laminates. In the FIG. 7A, first sub-laminates 60 and 70 are co-continuous with second sub-laminates 60 and 70 and with third sub-laminates 60 and 70.

Figure 8:
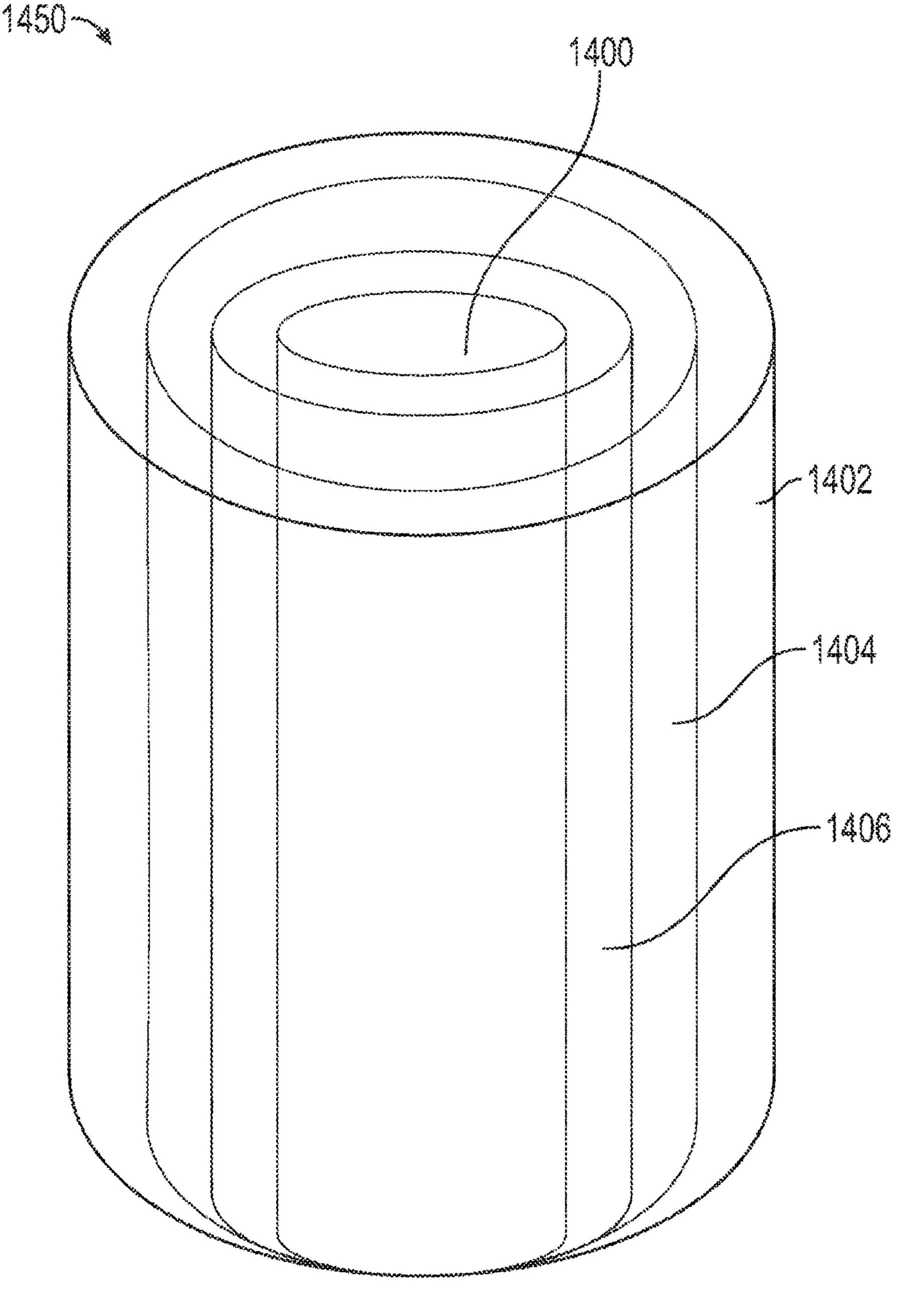
FIG. 8 is tubular preform having different layers each having a different pore size.

FIG. 8 depicts a tubular preform 1450 having a hollow core 1400 and three sub-laminates 1402, 1404 and 1406 each with different average pore sizes. In an embodiment, the tubular preform 1450 may be manufactured via 2D or 3D braiding. The inner sub-laminate 1406 has the smallest average pore size, the outer sub-laminate 1402 has the largest average pore size and the intermediate sub-laminate 1404 has an average pore size between that of the pore size of inner sub-laminate 1406 and the pore size of the outer sub-laminate 1402. The outer sub-laminate 1402 has a pore size greater than that of the inner sub-laminate and the intermediate sub-laminate.

It is contemplated that in some embodiments the location of sub-laminates 1406 and 1404 may be changed. In other words, the inner sub-laminate 1406 may have a larger average pore size than that of intermediate sub-laminate 1404. In this embodiment, both layers the inner sub-laminate 1406 and the intermediate sub-laminate 1404 each have average pore sizes that is less than the pore size of the outer sub-laminate 1402. In this event, there will be two gradients having opposing slopes—a first gradient in pore size between the inner sub-laminate and the intermediate sub-laminate and a second gradient in pore size between the intermediate sub-laminate and the outer sub-laminate. The first gradient will have an opposing slope from that of the second gradient.

It is to be noted that each sub-laminate may comprise one or more layers, where each layer in the sub-laminate may have a uniform pore size (in which case, there will not be a gradient in pore sizes in the sub-laminate) or where each layer in a sub-laminate may have a different pore size from a neighboring layer, thus leading to a gradient in pore-sizes in the sub-laminate. When each of the sub-laminates 1402, 1404 and 1406 comprise a plurality of layers each of which have uniform pore sizes, but where the uniform pore sizes are different for each of the sub-laminates, the preform will contain a gradient in pore sizes. Each of the sub-laminates may have different thicknesses or similar thicknesses.

After the formation of the preform detailed in the FIGS. 2A through 2C, 3A, 3B, 4A, 4B, 5, 6, 7 and 8, the preform may be subjected to matrix infiltration. It is to be noted that the tows used in the figures listed above may comprise ceramic fibers. Ceramic fibers of preform can have a polycrystalline structure. In one embodiment, ceramic fibers of preform layers can include a non-stoichiometric chemical composition or can include a stoichiometric chemical composition.

In one embodiment ceramic fibers of preform are single crystal fibers, polycrystalline fibers or by amorphous fibers. In an embodiment, ceramic fibers of the preform can comprise silicon carbide (SiC), carbon, alumina ($Al_2O_3$), mullite ($Al_2O_3$—$SiO_2$), or a combination thereof. The preform is then subjected to precursor infiltration (in a precursor infiltration (CVI) treatment chamber reactor) to encapsulate the fibers in a ceramic matrix.

An appropriate precursor for CVI can include, for example, any one of, or a mixture of two or more of, hydrogen, methyl-trichlorosilane, boron trichloride, ammonia, trichlorosilane, and a hydrocarbon precursor. An appropriate precursor can include, e.g., any silane containing precursor as well as any siloxane, silazane, or other silicon containing precursor. The precursor within the CVI treatment chamber reactor can be devoid of a primary flow direction. Providing a precursor within a chamber reactor to be devoid of a primary flow direction can reduce processing cost.

The temperature within the CVI chamber can be raised, and the reactant precursors can undergo a chemical reaction at high temperature. During a reaction a matrix coating can be formed on surfaces of fibers of the preform. The matrix can comprise, e.g., SiC, $Al_2O_3$, BN, $B_4C$, $Si_3N_4$, $MoSi_2$, $SiO_2$, SiOC, SiNC, and/or SiONC. The deposition and densification of the matrix on the preform produces the ceramic matrix composite. While CVI is discussed in detail here, other matrix infiltration processes such as polymer infiltration pyrolysis (PIP) and melt infiltration (MI) may also be used. They are not detailed here as the details are available elsewhere.

3D ceramic matrix composites have a number of advantages over a 2D ceramic matrix composites. These include potentially lower costs and the ability to enable the production of more near net shape structures. In addition, the 3D architecture adds benefit to interlaminar properties by having z-fibers. Z-fibers traverse the ceramic matrix composite in the thickness direction (the z-direction-which is perpendicular to the lateral and longitudinal directions detailed above) which improves interlaminar properties and reduces delamination between layers or between laminates.

The use of arranging the layers (to form the preform) as depicted above produces a uniform concentration of matrix material near the outer surface of the preform as well as in the center of the preform. The formation of voids and other stress concentrators are reduced in the center of the preform, when the layers in the preform are arranged to have a gradient in average pore size from the outermost layer to the center of the preform. The formation of voids and other stress concentrators are reduced in the center of the preform, when the layers in the preform are arranged to have the gradient in average pore size detailed above.

The method described herein can be used to prepare a variety of components comprising matrix composites such as components in the aviation industry, marine industry and energy industry. Exemplary components include components for gas turbine engines, such as in high pressure compressors (HPC), fans, boosters, high pressure turbines (HPT), and low pressure turbines (LPT). More specifically exemplary components include combustion liners, shrouds, nozzles, stators, vanes, and blades.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A preform comprising:

a first sub-laminate comprising a plurality of layers; where the first sub-laminate comprises a first unit cell comprising a first volume fraction of tows; where the first volume fraction of tows comprise first tows having a first tow spacing between successive first tows; and a second sub-laminate comprising a plurality of layers; where the second sub-laminate comprises a second unit cell comprising a second volume fraction of tows; where the second volume fraction of tows comprise second tows having a second tow spacing between successive second tows; where the first volume fraction of tows in the first unit cell is equal to the second volume fraction of tows in the second unit cell; where the second tow spacing is less than the first tow spacing;

wherein the first sub-laminate contacts the second sub-laminate; and wherein a warp tow from the first sub-laminate penetrates the second sub-laminate or vice versa.

2. The preform of claim 1, wherein the first tow spacing produces a first average pore size and where the second tow spacing produces a second average pore size; where the first average pore size is greater than the second average pore size.

3. The preform of claim 1, wherein a number of second tows in the second unit cell is greater than a number of first tows in the first unit cell.

4. The preform of claim 1, wherein a second tow diameter in the second unit cell is smaller than a first tow diameter in the first unit cell.

5. The preform of claim 1, wherein the warp tow from the first sub-laminate that penetrates the second sub-laminate interpenetrates a fill tow of the second sub-laminate or the warp tow from the second sub-laminate that penetrates the first sub-laminate interpenetrates the fill tow of the first sub-laminate.

6. The preform of claim 1, where the first tow spacing and the second tow spacing are both periodic.

7. The preform of claim 1, where the first tow spacing is periodic while the second tow spacing is aperiodic or vice versa.

8. The preform of claim 1, where the preform comprises a plurality of sub-laminates in addition to the first sub-laminate and the second sub-laminate; and where each sub-laminate of the plurality of sub-laminates has a same tow volume fraction per unit cell as that of the first sub-laminate.

9. The preform of claim 1, where the first sub-laminate contains an outermost layer, while the second sub-laminate does not contain an outermost layer.

10. A ceramic matrix composite comprising the preform of claim 1.

11. A preform comprising:

a first sub-laminate comprising a first plurality of first layers; where at least one layer of the first plurality of first layers comprises a first spacing between successive first tows that is different from a second spacing between successive second tows in an adjacent first layer; wherein the first sub-laminate has a first average pore size; and a second sub-laminate comprising a second plurality of second layers; where each layer of the second plurality of second layers has a third spacing between successive tows; wherein the second sub-laminate has a second average pore size that is less than the first average pore size; and wherein at least one of the first sub-laminate or the second sub-laminate has at least two gradients in porosity that have opposing slopes;

wherein the first sub-laminate contacts the second sub-laminate; and wherein a warp tow from the first sub-laminate penetrates the second sub-laminate or vice versa.

12. The preform of claim 11, wherein the first average pore size is determined by the first spacing and the second spacing.

13. The preform of claim 11, wherein the warp tow from the first sub-laminate that penetrates the second sub-laminate interpenetrates a fill tow of the second sub-laminate or the warp tow from the second sub-laminate that penetrates the first sub-laminate interpenetrates the fill tow of the first sub-laminate.

14. The preform of claim 11, wherein the first sub-laminate comprises an outermost layer and wherein the second sub-laminate does not comprise an outermost layer.

15. The preform of claim 11, wherein the first spacing is periodic and the second spacing is periodic.

16. A ceramic matrix composite comprising the preform of claim 11.

17. A preform comprising:

a first region comprising one or more first sub-laminates; wherein the one or more first sub-laminates comprise a first gradient in average pore size along a first cross-section of the preform; where the first cross-section of the preform is located in the first region; and a second region, wherein the second region contacts the first region; and wherein the second region comprises one of more second sub-laminates; wherein the one or more second sub-laminates comprise a second gradient in average pore size along a second cross-section of the preform; where the second gradient in average pore size is different from the first gradient in average pore size; where the first region has a different thickness from the second region; where the second cross-section is located at the second region and wherein the second region is not the same as the first region;

wherein the first sub-laminate contacts the second sub-laminate; and wherein a warp tow from the first sub-laminate penetrates the second sub-laminate or vice versa.

18. The preform of claim 17, further comprising a third region; where the third region comprises one or more third sub-laminates; wherein the one or more third sub-laminates comprises a third gradient in average pore size along a third cross-section of the preform; wherein the third gradient in average pore size is different from at least one of the first gradient and the second gradient; where the third cross-section is located at the third region.

19. The preform of claim 17, where a thickness of the third region is different from a thickness of at least one of the first region and the second region.

20. A ceramic matrix composite comprising a preform of claim 17.

* * * * *